United States Patent
Gabriel et al.

(10) Patent No.: US 7,920,747 B2
(45) Date of Patent: Apr. 5, 2011

(54) PRE-DISTRIBUTION IMAGE SCALING FOR SCREEN SIZE

(75) Inventors: Logan S. Gabriel, Raleigh, NC (US); Eric R. Kern, Chapel Hill, NC (US); Paul K. Scrutton, Durham, NC (US); David R. Woodham, Cedar Park, TX (US); Tong Yu, Cary, NC (US); Michael S. Rollins, Durham, NC (US); Janae V. Simons, Durham, NC (US); David R. Chiluk, Austin, TX (US); Torez Smith, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1000 days.

(21) Appl. No.: 11/746,432

(22) Filed: May 9, 2007

(65) Prior Publication Data

US 2008/0279461 A1 Nov. 13, 2008

(51) Int. Cl.
*G06K 9/36* (2006.01)
(52) U.S. Cl. ...................................................... 382/232
(58) Field of Classification Search .................. 382/232, 382/298–299; 345/660–661; 709/201, 204, 709/217, 231–232; 715/202, 204, 744–749; 725/62, 95, 105; 358/528; 348/581
See application file for complete search history.

(56) References Cited

U.S. PATENT DOCUMENTS

| | | | |
|---|---|---|---|
| 6,345,279 B1 | 2/2002 | Li et al. | |
| 6,628,300 B2 * | 9/2003 | Amini et al. | 345/660 |
| 7,069,573 B1 | 6/2006 | Brooks et al. | |
| 7,103,668 B1 | 9/2006 | Corley et al. | |
| 7,577,910 B1 * | 8/2009 | Husemann et al. | 715/744 |
| 2005/0091311 A1 | 4/2005 | Lund et al. | |
| 2006/0136597 A1 | 6/2006 | Shabtai et al. | |
| 2006/0188173 A1 | 8/2006 | Zhang et al. | |
| 2006/0200845 A1 | 9/2006 | Foster et al. | |

* cited by examiner

*Primary Examiner* — Jose L Couso
(74) *Attorney, Agent, or Firm* — Steven M. Greenberg, Esq.; Carey Rodriguez Greenberg Paul, LLP

(57) ABSTRACT

Embodiments of the present invention address deficiencies of the art in respect to video scaling and compression and provide a novel and non-obvious method, system and computer program product for pre-distribution image scaling for screen size. In one embodiment of the invention, a compressed video delivery method can be provided. The method can include determining a display size for a target computing platform, pre-scaling video imagery to comport with the display size of the target computing platform, compressing the pre-scaled video imagery, and transmitting the compressed, pre-scaled video imagery to the target computing platform over a computer communications network.

17 Claims, 2 Drawing Sheets

US 7,920,747 B2

PRE-DISTRIBUTION IMAGE SCALING FOR SCREEN SIZE

BACKGROUND OF THE INVENTION

1. Field of the Invention

The present invention relates to the field of remote distribution of video imagery over a computer communications network.

2. Description of the Related Art

The conventional video display for a computing device has been widely used for many years. The primary function of the video display includes providing a medium for rendering a user interface through which an end-user can interact with an underlying application in the computing device, and for presenting audiovisual content. For most fixed computing devices, including personal computers, there is little practical limit of the resolution and size of an image that can be displayed in the display. The same is not true of other computing devices. In fact, for the typical pervasive device, display space comes at a premium.

"Pervasive computing" refers to any non-constrained computing device not physically tethered to a data communications network. Thus, pervasive computing devices refer not only to computers wirelessly linked to networks, but also to handheld computing devices, cellular telephones, wearable systems, embedded computing systems and the like. In the case of pervasive devices, the display area sometimes can be limited to as little as a 160 pixel by 160 pixel region or less. Thus, for conventional Web browsing, the display area of the typical pervasive device can be quite limiting.

Despite the inherent size limitations of its display, the pervasive device not only can be used to view the static content of the ordinary Web page, but also audiovisual material provided by an audiovisual source over a computer communications network such as the global Internet. To facilitate the transmission of video imagery over the Internet to a pervasive device, oftentimes the video imagery can be compressed. One popular form of compression includes "run length encoding". Run length encoding is a simple form of data compression in which identical data values within a sequence of data are stored as a single value with an indication of "count" as it is well known in the art. Run length encoding, like other compression schemes, can be taxing on computing resources.

Generally, resource consumption is a necessary consequence of video compression, however on occasion resources are needlessly consumed during video compression. In illustration, FIG. 3 is a flow chart depicting a process for image scaling for screen size known in the art. As shown in FIG. 3, two different video images 330A, 330B can be compared and a differential image 350 can be computed through an exclusive or operation 340. The differential image 350 can be compressed in block 360 and only then, can the compressed image be scaled in block 370 to produce a compress, scaled form of the image 380 suitable for transmission to a target device. Thus, it will be apparent that computing resources will have been squandered on aspects of the differential image 350 that will not survive scaling in block 370.

For the individual circumstance where a single file is to be compressed at a time, the resulting resource consumption can be of no consequence. However, in an environment where video is to be distributed to a vast number of pervasive devices disposed about a wide scale computer communications network such as the Internet, the repeated and frequent compression of the video can place an undesirable burden on the computing resources of the video server. To compound matters, once the pervasive device has received compressed imagery, the pervasive device must resize the decompressed imagery to meet the display size limitations of the pervasive device undesirably consuming yet additional process resources.

BRIEF SUMMARY OF THE INVENTION

Embodiments of the present invention address deficiencies of the art in respect to video scaling and compression and provide a novel and non-obvious method, system and computer program product for pre-distribution image scaling for screen size. In one embodiment of the invention, a compressed video delivery method can be provided. The method can include determining a display size for a target computing platform, pre-scaling video imagery to comport with the display size of the target computing platform, compressing the pre-scaled video imagery, and transmitting the compressed, pre-scaled video imagery to the target computing platform over a computer communications network.

In another embodiment of the invention, a compressed video delivery data processing system can be provided. The system can include a video compressor, a video application programming interface (API) providing access to the video compressor, and a video thread of execution. The video thread of execution can include program code enabled to determine a display size for a target computing platform, pre-scale video imagery to comport with the display size of the target computing platform, command the compression of the pre-scaled video imagery by the video compressor through the video API, and to transmit the compressed, pre-scaled video imagery to the target computing platform over a computer communications network.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for pre-distribution image scaling for screen size. In accordance with an embodiment of the present invention, an image intended for distribution to a target device over a computer communications network can be scaled to a size consistent with the target device. Once scaled, the image can be compressed and distributed to the target device over the computer communications network for decompression and display in the target device. In this way, the process of compression can be optimized for the display size of the target device and resources need not be needlessly wasted on a pre-scaled image.

Figure 1:
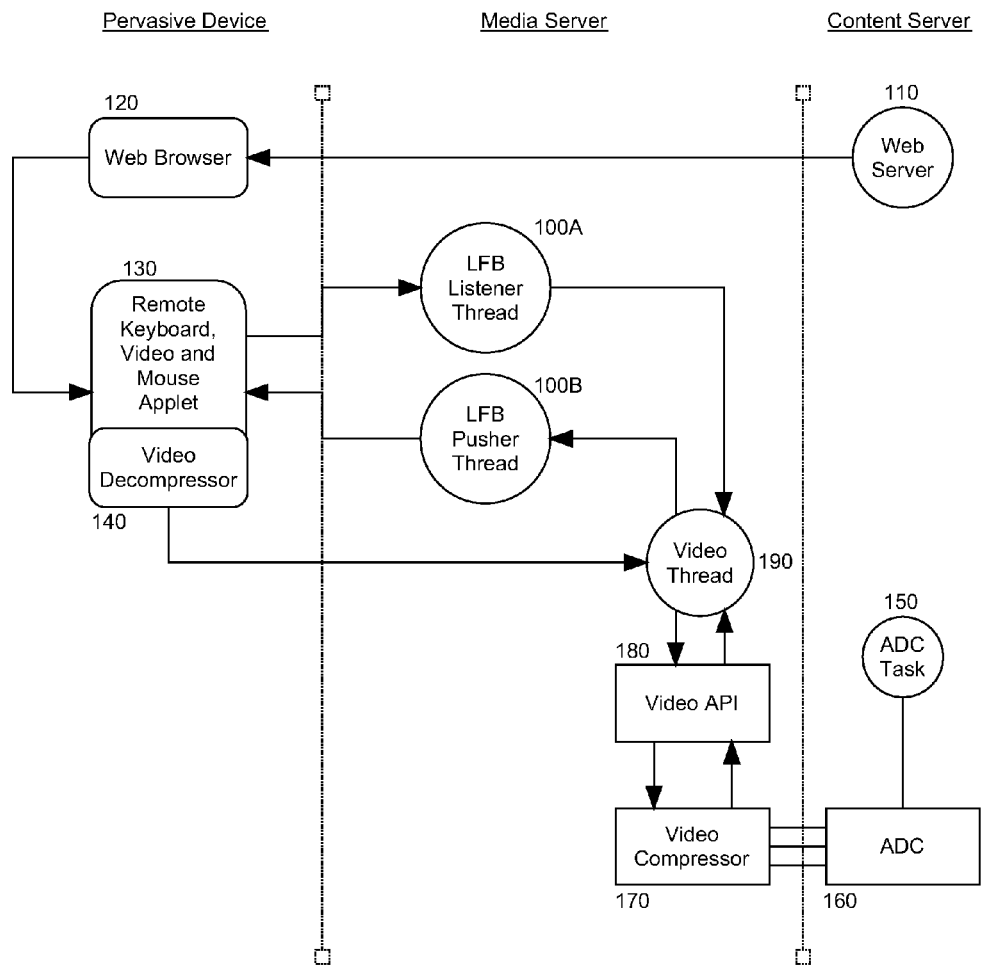
FIG. 1 is a schematic illustration of a video distribution system configured for pre-distribution image scaling for screen size.

In further illustration, FIG. 1 is a schematic illustration of a video distribution system configured for pre-distribution image scaling for screen size. The system can include a Web server 110 in a content server system communicatively coupled to a Web browser 120 supported in operation by a target computing platform 130, for instance a pervasive device. The Web server 110 can serve content incorporating media content. To that end, a media server can support the distribution of video media and can include a video compressor 170 coupled to an analog-to-digital converter 160 under the control of an analog-to-digital conversion logical task 150. In this way, an analog signal produced by a video source can be digitized and compressed for distribution to the target computing platform 130.

The media server can provide a video thread of execution 190 supporting the operation both of a light-weight frame buffer (LFB) listener thread of execution 100A and an LFB pusher thread of execution 100B. The LFB listener thread of execution 100A can include program code enabled to receive user interface events from the target computing platform 130 controlling the playback of video whereas the LFB pusher thread of execution 100B can include program code enabled to transmit compressed video content to the target computing platform 130. In the latter circumstance, the LFB pusher thread of execution 100B can retrieve the compressed video content from the video compressor 170 via an application programming interface 180 to the video compressor 170.

In accordance with the present invention, the video thread of execution 190 can include program code enabled to determine display characteristics for the target computing platform 130. The program code of the video thread of execution 190 additionally can be enabled to scale video imagery to support the determined display characteristics prior to requesting compression of the video imagery by the video compressor 170. Finally, the program code of the video thread of execution 190 can be enabled to transmit the compressed, scaled form of the video imagery to the target computing platform 130 in which the video decompressor 140 can decompress the received video imagery for display in the target computing platform 130.

Figure 2A:
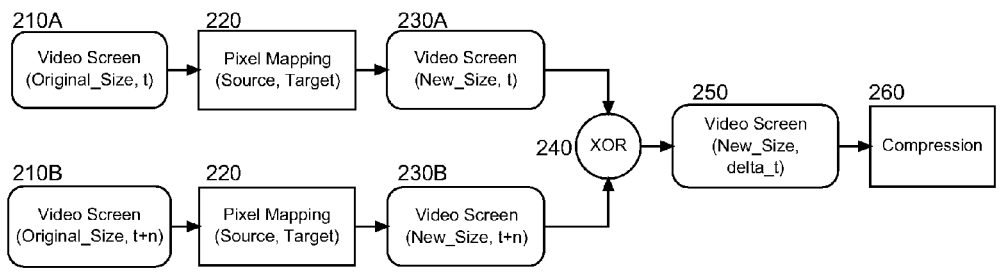
FIG. 2A is a flow chart illustrating a process for pre-distribution image scaling for screen size.

Turning now to FIG. 2A, a flow chart is shown which illustrates a process for pre-distribution image scaling for screen size in accordance with an embodiment of the present invention. As shown in FIG. 2A, two different video images 210A, 210B can be individually scaled in blocks 220 to produce respectively scaled forms of the images 230A, 230B each of which comport with a display size of a target computing platform. Subsequently, the respectively scaled forms of the images 230A, 230B can be compared and a differential image 250 can be computed through an exclusive or operation 240. The differential image 250 can be compressed in block 260 for transmission to a target device.

Figure 2B:
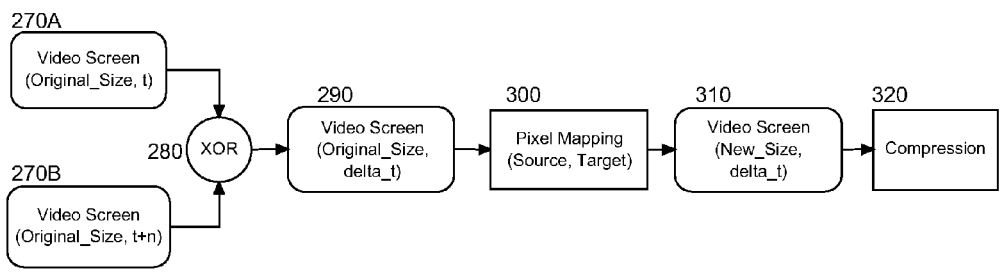
FIG. 2B is a flow chart illustrating an alternative process for pre-distribution image scaling for screen size; and, FIG. 3 is a flow chart illustrating a process for image scaling for screen size known in the art.
Figure 3:
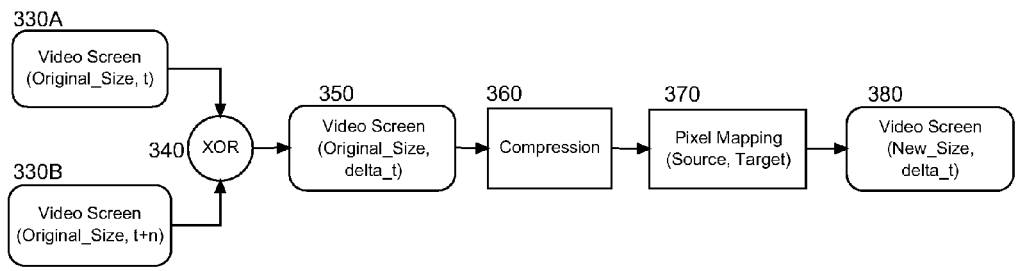

Turning now to FIG. 2B, a flow chart is shown which illustrates another process for pre-distribution image scaling for screen size in accordance with another embodiment of the present invention. As shown in FIG. 2B, two different video images 270A, 270B can be compared and a differential image 290 can be computed through an exclusive or operation 280. The differential image 290 can be scaled in block 300 to produce a scaled form of the differential image 310 which can comport with a display size of a target computing platform. Subsequently, the scaled form of the differential image 310 can be compressed in block 320 for transmission to a target device.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A compressed video delivery method comprising:
   determining a display size for a target computing platform;
   pre-scaling video imagery to comport with the display size of the target computing platform;
   compressing the pre-scaled video imagery; and,
   transmitting the compressed, pre-scaled video imagery to the target computing platform over a computer communications network.

2. The method of claim 1, wherein pre-scaling video imagery to comport with the display size of the target computing platform, comprises:
   computing a difference between two video images for two different times to produce differential video imagery; and,
   pre-scaling the differential video imagery to comport with the display size of the target computing platform.

3. The method of claim 1, wherein pre-scaling video imagery to comport with the display size of the target computing platform, comprises:
pre-scaling each of two video images for two different times to comport with the display size of the target computing platform; and,
computing a difference between the pre-scaled video images to produce pre-scaled, differential video imagery.

4. The method of claim 1, wherein compressing the pre-scaled video imagery, comprises run length encoding the pre-scaled video imagery.

5. The method of claim 1, wherein transmitting the compressed, pre-scaled video imagery to the target computing platform over a computer communications network, comprises responding to a request received in a Web server in transmitting the compressed, pre-scaled video imagery to the target computing platform over a computer communications network.

6. The method of claim 1, wherein determining a display size for a target computing platform, comprises determining a display size for a target pervasive device.

7. The method of claim 6, wherein transmitting the compressed, pre-scaled video imagery to the target computing platform over a computer communications network, comprises transmitting the compressed, pre-scaled video imagery to the target pervasive device.

8. A compressed video delivery data processing system comprising:
a video compressor;
a video application programming interface (API) providing access to the video compressor; and,
a video thread of execution comprising program code enabled to
determine a display size for a target computing platform,
pre-scale video imagery to comport with the display size of the target computing platform,
command the compression of the pre-scaled video imagery by the video compressor through the video API, and to
transmit the compressed, pre-scaled video imagery to the target computing platform over a computer communications network.

9. The system of claim 8, wherein
the video thread of execution is coupled to a video pusher thread comprising program code enabled to transmit the compressed, pre-scaled video imagery to the target computing platform over a computer communications network, and a video listener thread comprising program code enabled to receive user input in respect to the pre-scaled video imagery from the target computing platform over the computer communications network.

10. The system of claim 8, further comprising a Web server coupled to the video thread of execution and configured to receive a Web request for the video imagery.

11. A computer program product comprising a computer usable storage medium having stored therein computer usable program code for compressed video delivery, the computer usable program code, which when executed by a computer hardware system, causing the computer hardware system to perform:
determining a display size for a target computing platform;
pre-scaling video imagery to comport with the display size of the target computing platform;
compressing the pre-scaled video imagery; and
transmitting the compressed, pre-scaled video imagery to the target computing platform over a computer communications network.

12. The computer program product of claim 11, wherein the pre-scaling video imagery comprises:
computing a difference between two video images for two different times to produce differential video imagery; and
pre-scaling the differential video imagery to comport with the display size of the target computing platform.

13. The computer program product of claim 11, wherein the pre-scaling video imagery comprises:
pre-scaling each of two video images for two different times to comport with the display size of the target computing platform; and
computing a difference between the pre-scaled video images to produce pre-scaled, differential video imagery.

14. The computer program product of claim 11, wherein the compressing comprises run length encoding the pre-scaled video imagery.

15. The computer program product of claim 11, wherein the transmitting comprises responding to a request received in a Web server for the video imagery.

16. The computer program product of claim 11, wherein the display size is determined for a target pervasive device.

17. The computer program product of claim 16, wherein the compressed, pre-scaled video imagery is transmitted to the target pervasive device.

\* \* \* \* \*